Jan. 3, 1956  N. H. ROY  2,729,327
SHIPPING CONTAINER WITH INTERNAL RESILENT MOUNTING MEANS
Filed May 14, 1953  2 Sheets-Sheet 1
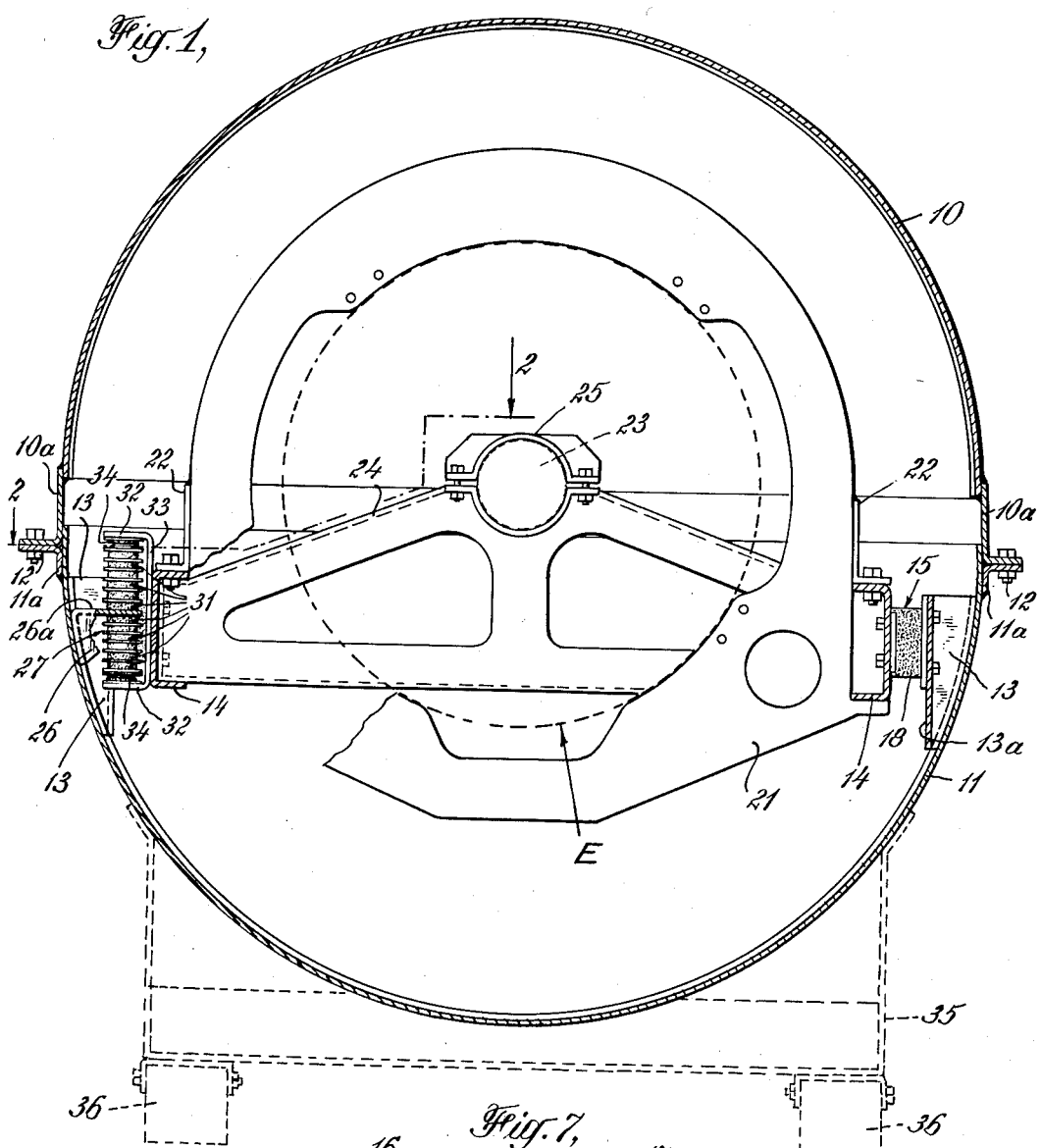
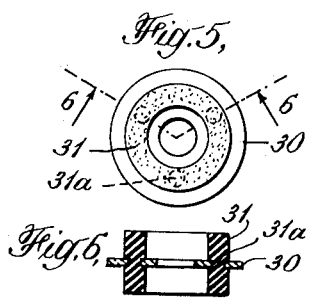
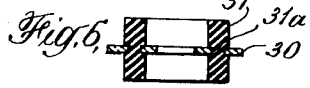
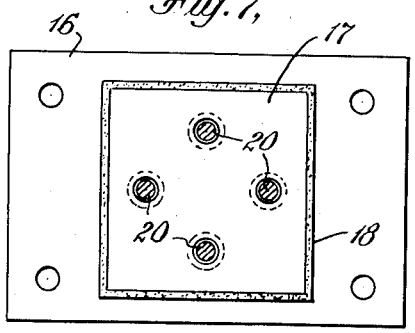
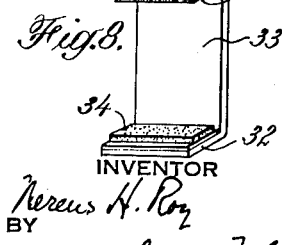
INVENTOR
Nereus H. Roy
BY
Pennie Edmonds Morton Barrows Taylor
ATTORNEYS

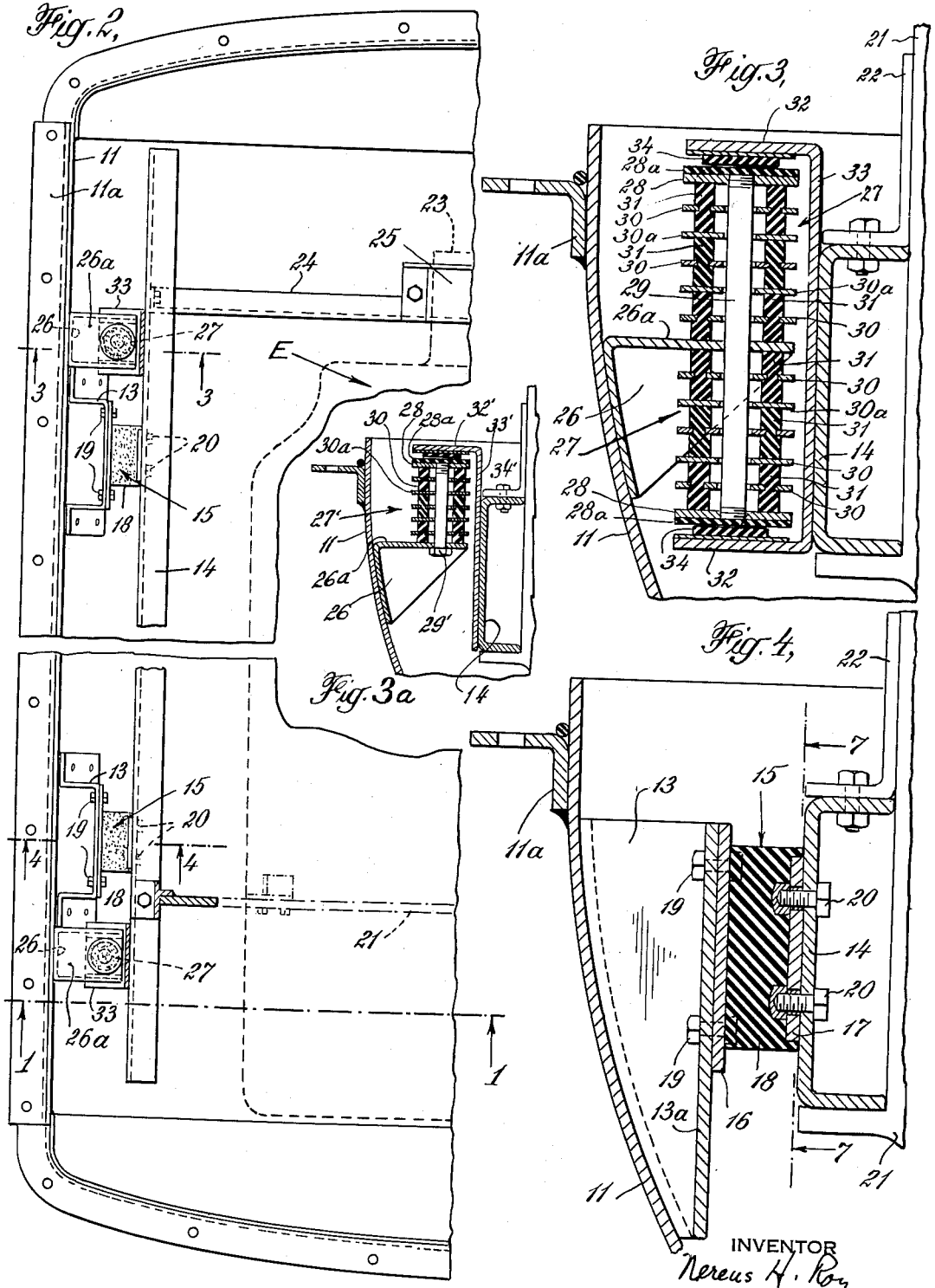

United States Patent Office 2,729,327
Patented Jan. 3, 1956

2,729,327

SHIPPING CONTAINER WITH INTERNAL RESILIENT MOUNTING MEANS

Nereus H. Roy, Glenbrook, Conn., assignor to Waugh Equipment Company, New York, N. Y., a corporation of Maine Application May 14, 1953, Serial No. 355,050

2 Claims. (Cl. 206—46)

This invention relates to mounts to be interposed between an object and a fixed support, such a mount carrying the weight of the object and isolating it from vibration and absorbing shock. More particularly, the invention is concerned with a novel mount of the type referred to, which is of simple construction, light in weight, and highly effective for its intended purpose. The new mount may be used to advantage in shipping containers for heavy objects having delicate working parts, which require protection during shipment and handling against vibration and shock capable of causing mis-alignment or breakage of the parts, and the invention, accordingly, comprehends a shipping container of novel construction, in which the object being shipped is supported on one or more of the new mounts. The container of the invention may be used in the shipping of objects of various kinds and the full advantages of the container are realized in a form suitable for the shipment of jet aircraft engines. Such a container will, therefore, be illustrated and described in detail for purposes of explanation.

Jet engines for aircraft use are of large size and great weight and they are frequently shipped long distances, for example, overseas to aircraft repair stations. It has been customary to ship each engine in its individual container and the problem has been to mount the engine in the container in such a way as to protect it against vibration and shock. Ordinary resilient mountings including rubber blocks under shear are not adequate for the purpose, because, under some conditions, as, for example, when the shipment is being made by freight car, the relative vibratory movement of the engine and container may develop an amplitude sufficient to cause the engine to strike the container wall. Also such a mounting affords insufficient protection to the engine against a shock resulting from the container being dropped or otherwise roughly handled.

The shipping container of the invention includes a casing of suitable size and strength, which, when used for jet engines, is ordinarily of cylindrical form and is made up of upper and lower longitudinal sections. The lower section of the casing is provided with a plurality of supports, which may be in the form of brackets attached to the wall of the section on opposite sides of a vertical median plane through the section and are spaced longitudinally. The jet engine is attached to a pair of members, which may be of channel form and are secured to the supports through the resilient mounts of the invention.

The new mounts each include a rubber shear block and a rubber spring unit. Each shear block comprises a pair of metal plates bonded to opposite faces of a body of rubber and, in the shipping container, one plate of each shear block is secured to a support and the other to a channel member attached to the object. The rubber spring unit comprises a plurality of rubber springs mounted between a support and a member attached to the object and, in the shipping container of the invention, each spring unit is mounted on a support on the casing in position to be engaged by a projection on the member, but is normally out of contact with the projection. The shear blocks and spring units are of different characteristics and the arrangement is such that normal vibration between the casing and the object results only in deflection of the shear blocks alternately in opposite directions. However, if the vibration approaches the resonant frequency of the supported object and the amplitude of vibration increases beyond a selected limit, the spring units are engaged by the projections on the members attached to the load and act to limit the amplitude of vibration of the load. The spring units have a natural frequency different from that of the shear blocks and, when the spring units become effective, the natural frequency of the object and the combination of the shear blocks and spring units is altered, so that the applied force, which produced the resonant vibration of the load supported by the shear blocks only no longer has that effect. The spring units also act to absorb heavy shocks, which might result from the casing being dropped.

For a better understanding of the invention, reference may be made to the accompanying drawings, in which:

Figure 1 is a transverse sectional view on the line 1—1 of Figure 2 of one form of the new shipping container for a jet engine;

Figure 2 is a half sectional view on the line 2—2 of Figure 1;

Figure 3 is a sectional view on an enlarged scale on the lines 3—3 of Figure 2;

Figure 3a is a view similar to Figure 3 of a modified construction;

Figure 4 is a sectional view on an enlarged scale on the lines 4—4 of Figure 2;

Figure 5 is a plan view of one of the rubber springs employed in the container;

Figure 6 is a sectional view on the line 6—6 of Figure 5;

Figure 7 is a sectional view on the line 7—7 of Figure 4; and

Figure 8 is a view in perspective of the unit providing the stops.

The shipping container, shown in Figure 1, is for a jet engine E, of which the outline only is shown. The container is made of sheet metal and is of generally cylindrical form with domed ends and made up of an upper longitudinal section 10 and a lower longitudinal section 11. Section 10 is provided with angle irons 10a secured along its edges, as by welding, and section 11 is similarly provided with angle irons 11a. The angle irons 10a are spaced to receive the edge of section 11 between them and, when the two sections are assembled in partially telescoped relation, outwardly extending flanges on the angle irons on the two sections are in contact and can be connected by bolts 12 to hold the sections together and close the container.

The lower section 11 is provided with a plurality of supports secured to the inner surface of its wall in longitudinally spaced relation on opposite sides of the longitudinal median plane of the section and, in the container illustrated, the supports include brackets 13 secured to the wall of the section in any convenient manner, as by welding. The container shown is provided with two brackets on each side and each bracket has a vertical face 13a. The engine E is attached to longitudinal members 14 of channel form lying on opposite sides of the engine, and each channel member is secured to the lower section of the casing by a plurality of the new mounts, each of which includes a rubber shear block and a simple or compound rubber spring unit.

Each rubber shear block 15 is interposed between a bracket 13 and the adjacent face of a channel member 14 and comprises a pair of metal plates 16, 17 having their flat faces opposed and bonded to opposite sides of a rubber body 18. The plate 16 is secured to the vertical face 13a of bracket 13 by bolts 19 and plate 17 is secured to the vertical face of channel member 14 by bolts 20. With this arrangement, the channel members may move vertically and horizontally with reference to the brackets against the resistance of the shear blocks.

The channels are provided with suitable means, by which they may be rigidly attached to the engine E and, for this purpose, the channels may have brackets secured thereto, which can be bolted to suitable parts of the engine. In the construction shown, the large end of the engine is encircled by a diaphragm 21, which is bolted to the engine and secured to the channels in any suitable way, as by means of brackets 22 rigidly attached to the opposite sides of the diaphragm and bolted to the channels. At the opposite end of the engine, the end of the propeller shaft 23 rests upon a concave seat in the top of a member 24 extending across the container from one channel to the other and connected thereto, the shaft being held in place on the seat by a collar 25 secured to the member.

With the arrangement described, the container and the members with the load secured thereto are free to move relatively to one another against the resistance of the shear blocks and, in normal vertical vibration, the members and load do not come into contact with the container wall.

The rubber spring unit of each mount is attached to an arm 26a forming part of a bracket secured to the inside of the lower section of the container adjacent a bracket 13. In the construction shown in Figure 3, each rubber spring unit is a compound unit and includes two simple units 27 mounted in alignment and engaging opposite faces of an arm 26a. A metal follower plate 28 having a rubber facing or pad 28a on its outer face is applied to the outer face of the unit and the two followers are connected by a tie rod 29, which is threaded into each follower and extends through aligned openings in the arm 26a and the two spring units. Each unit comprises three rubber springs, each made of a metal disc 30 having rubber rings 31 applied against opposite faces thereof and connected by rubber plugs 31a extending through openings in the disc. Adjacent springs in a spring unit are separated by flat metal divider plates 30a. In assembling the units and followers as described, a desired amount of precompression may be applied to the units by means of the tie rod.

A pair of stops 32 are mounted on each channel member 14 adjacent each bracket 26 and the stops of each pair may be formed as flanges of a channel member 33 secured to the channel member 14. The stops of each pair lie in alignment with the ends of the compound spring unit carried by an arm 26a and the opposed faces of the stops are provided with rubber pads 34. These rubber pads and the pads 28a on the followers 28 are of soft yielding rubber. The stops 32 of a pair are normally spaced from respective ends of the compound spring unit, but, under conditions of excessive vibration or shock, one or the other of the stops engages the adjacent end of the spring unit, so that the latter may come into action to prevent damage to the object.

In the modified construction shown in Figure 3a, the parts identical with those in the construction of Figure 3, are identified by the same reference characters. The modified construction includes a simple spring unit 27', which is made up of a plurality of rubber springs 30 separated by divider plates 30a. The unit rests upon the top of the arm 26a of a bracket 26 and is provided at its top with a follower 28 having a rubber pad 28a at its outer face. The follower is held in place by a tie rod 29', which has a head engaging the under side of arm 26a and extends through the rubber spring and is threaded into follower 28. The tie rod may be taken up to apply the desired precompression to the spring unit. The adjacent channel member 14 is provided with a stop overlying the top of the unit 27' and the stop takes the form of an arm 32', which may be one flange of an L-shaped member 33' having its other flange secured to the adjacent channel member 14. The stop 32' is provided on its under surface with a rubber facing 34'.

If desired, the lower section of the casing may be provided with a skid assembly comprising frame members 35 attached to the casing wall and provided with wooden skids 36. The upper section of the casing may also be provided with means (not shown) by which the container can be lifted and lowered.

In the new mount, the shear block employed is relatively stiff, so that its deflection is small in relation to the applied load. The spring unit has the opposite characteristic and is relatively soft, so that it undergoes a high deflection in relation to the applied load. The spring unit is installed under relatively low precompression and the action of the mount is as follows. The load is normally supported only by the shear block of the mount and, if the load is subjected to vibrational forces, which approach the resonant frequency of the load and shear block, the amplitude of vibration will build up. Initially, the vibration causes deflection only of the shear block, but, as the amplitude increases, the pads on the spring unit and on the opposed stop come into contact and are compressed. These pads are so soft that they do not provide any substantial snubbing action, but, as the amplitude of vibration further increases, the spring unit ultimately acts through the stop to resist movement of the object. When the spring unit is effective, the vibrating mass has a resonant frequency different from that of the mass supported only by the shear blocks and, as a result, the forces applied are ineffective to produce a vibration of dangerous amplitude.

In the event that the supported load is subjected to a severe shock, as a result, for example, of the dropping of a container, in which the load is carried by the mounts, the deflection of the shear blocks quickly brings the spring units into action and the blocks and the spring units then cooperate to absorb the shock and prevent the load from coming in contact with the wall of the container.

In the mounts illustrated, each spring unit is shown as including a stack of springs made up of three individual springs. It is to be understood, of course, that the number of springs in a stack will be chosen in consideration of the purpose for which the unit is to be employed, and more or less springs may be used in mounts for different purposes.

I claim:

1. In a shipping container for an object, the combination of a casing, a pair of mounting members within the casing along opposite sides of the casing, means for securing the members to the object, a rubber shear block interposed between each member and the casing, the block having one vertical face secured to the member and the opposite vertical face secured to the casing, and means for limiting vertical movement of each member relative to the casing in one direction including a spring unit secured to the casing adjacent each shear block, and a stop mounted on the member and overlying and normally spaced from the spring unit, the spring unit having a natural frequency different from that of the shear block and being engageable by the stop and operable after such engagement to resist movement of the stop and object toward the unit.

2. In a shipping container, the combination of a casing, a mounting member within the casing, means for securing the member to an object, a rubber shear block interposed between the member and the casing, the block having one vertical face secured to the member and its opposite vertical face secured to the casing, and means for limiting vertical movement of the member relative to the casing in one direction including a rubber spring unit secured to the casing adjacent the shear block, and a stop mounted on the member and overlying and normally spaced from the spring unit, the spring unit having a natural frequency different from that of the shear block and being engageable by the stop after a given deflection of the shear block and operable after such engagement to resist movement of the stop and object toward the unit.

References Cited in the file of this patent

UNITED STATES PATENTS

| | | |
|---|---|---|
| 1,924,504 | Lee | Aug. 29, 1933 |
| 2,382,373 | Lord | Aug. 14, 1945 |
| 2,397,804 | Nahken et al. | Apr. 2, 1946 |
| 2,407,588 | Thiry | Sept. 10, 1946 |
| 2,520,442 | Schwartz | Aug. 29, 1950 |
| 2,613,807 | Higbee | Oct. 14, 1952 |